United States Patent
Grandl (10) Patent No.: US 10,992,728 B2
(45) Date of Patent: Apr. 27, 2021

(54) MEDIA STREAMING (71) Applicant: bitmovin GmbH, Klagenfurt (AT)

(72) Inventor: Reinhard Grandl, Klagenfurt (AT)

(73) Assignee: bitmovin GmbH, Klagenfurt (AT)

( * ) Notice: Subject to any disclaimer, the term of this patent is extended or adjusted under 35 U.S.C. 154(b) by 0 days.

(21) Appl. No.: 15/267,720

(22) Filed: Sep. 16, 2016

(65) Prior Publication Data

US 2017/0006081 A1    Jan. 5, 2017

Related U.S. Application Data (63) Continuation of application No. PCT/EP2015/055290, filed on Mar. 13, 2015.

(60) Provisional application No. 61/954,063, filed on Mar. 17, 2014.

(51) Int. Cl.
*H04L 29/06* (2006.01)
*H04L 29/08* (2006.01)

(52) U.S. Cl.
CPC .......... *H04L 65/608* (2013.01); *H04L 65/601* (2013.01); *H04L 65/80* (2013.01); *H04L 67/02* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 9,635,077 B2* | 4/2017 | Swaminathan | H04L 65/4084 |
| 2006/0023729 A1* | 2/2006 | Choi | H04L 29/06027 |
| | | | 370/428 |
| 2011/0106969 A1* | 5/2011 | Choudhury | H04N 21/41407 |
| | | | 709/236 |
| 2013/0235152 A1* | 9/2013 | Hannuksela | H04N 19/597 |
| | | | 348/43 |

(Continued)

FOREIGN PATENT DOCUMENTS

WO    2013057315 A2    4/2013

OTHER PUBLICATIONS

IETF Working Group, on HTTP/2/0, "http://datatracker.ietf.org/wg/httpbis/charter/", 5 pages.

(Continued)

*Primary Examiner* — Sm A Rahman
*Assistant Examiner* — Dae Kim
(74) *Attorney, Agent, or Firm* — Michael A. Glenn; Perkins Coie LLP (57) ABSTRACT

Media streaming is more efficient in terms of transmission bitrate consumption, transmission latency and/or fair trade of transmission capacity among several by pushing media content rather than the client pulling media content from the server. Pushing media content to the client at a varying bitrate enables to shift, at least partially, the control over the streaming from the client towards the server. The server may continue to push segments of the media content to the client even without receiving explicit queries or directives for these segments thereby reducing upstream bandwidth consumption. As far as the bitrate adaption is concerned, the server may act as a slave remotely controlled by the client in that media content is pushed at a bitrate depending on the client's most recently sent information such as reception situation information explicitly indicating the bitrate to be used.

15 Claims, 6 Drawing Sheets

(56) References Cited

U.S. PATENT DOCUMENTS

| | | | |
|---|---|---|---|
| 2013/0290555 A1* | 10/2013 | Einarsson | G06F 17/30017 709/231 |
| 2014/0040498 A1* | 2/2014 | Oyman | H04L 67/36 709/231 |
| 2014/0040959 A1 | 2/2014 | Oyman | |
| 2014/0229529 A1* | 8/2014 | Barone | H04L 65/4076 709/203 |
| 2014/0280781 A1* | 9/2014 | Gregotski | H04L 67/06 709/219 |
| 2015/0067722 A1* | 3/2015 | Bjordammen | G06Q 30/0253 725/32 |
| 2015/0256861 A1* | 9/2015 | Oyman | H04N 21/2343 725/62 |
| 2015/0257035 A1* | 9/2015 | Grinshpun | H04W 28/0284 370/235 |
| 2015/0264096 A1* | 9/2015 | Swaminathan | H04L 65/4084 709/219 |
| 2015/0295976 A1* | 10/2015 | Lee | H04L 65/4084 709/219 |
| 2015/0373079 A1* | 12/2015 | Seedorf | G06F 16/00 709/218 |
| 2016/0277466 A1* | 9/2016 | Lohmar | H04L 65/4076 |

OTHER PUBLICATIONS

Mueller, Christopher et al., "Dynamic Adaptive Streaming over HTTP/2.0", IEEE International Conference on Multimedia and Expo (ICME), 2013, 6 pages.

Mueller, Christopher et al., "Using Scalable Video Coding for Dynamic Adaptive Streaming over HTTP in Mobile Environments", IEEE 20th European Signal Processing Conference, 2012, 5 pages.

\* cited by examiner

FIGURE 6

MEDIA STREAMING

CROSS-REFERENCE TO RELATED APPLICATIONS

This application is a continuation of copending International Application No. PCT/EP2015/055290, filed Mar. 13, 2015, which is incorporated herein by reference in its entirety, and additionally claims priority from U.S. Application No. 61/954,063, filed Mar. 17, 2014, which is incorporated herein by reference in its entirety.

The present application is concerned with streaming of media data such as video and/or audio signals.

BACKGROUND OF THE INVENTION

Media streaming technology allows people to watch video or hear an audio signal via a client operating on a person's desktop, mobile phone, computer or the like. During streaming, only a small portion of the media data is sent to the client device at a time. These portions may be called temporal segments or chunks. In case of bitrate adaptive streaming, the bitrate at which the media data is transmitted to the client's device is varied in order to account for the varying transmission and reception conditions including, for instance, the available transmission bandwidth, the buffer fullness at the client and so forth.

Dynamic adaptive streaming over HTTP (DASH) is a popular adaptive bitrate streaming technique for high quality streaming of multimedia content over the internet. DASH streaming typically partitions media content into a sequence of small temporal segments with each such temporal segment containing a portion of the media content in a short interval of playback time. Typically, the content is made available with a media presentation description (MPD) file or manifest which describes information concerning the temporal segments such as timing, URL, media characteristics such as video resolution and bitrates and so forth. One or more versions/representations of the temporal segments of the media content are typically available, the versions differing in bitrate, resolution or other factors, and a selection can be made, typically automatically, based on network conditions, device capabilities and user preference, thereby enabling adaptive streaming. For example, generally when content is played by a DASH client, the client automatically selects from the available segments the next segment to download with the highest bitrate possible that can be downloaded in time for playback without causing pauses or rebuffering events in the playback.

However, media streaming techniques such as DASH do not address all needs imposed by current network environments. As the bitrate adaptivity is driven by the clients, the communication overhead between server and client puts strain on the transmission network in terms of uplink transmission bandwidth consumption to the server and aspects such as fair assignment of available downlink transmission bandwidth capacity to several clients is difficult to realize. Accordingly, it is an object of the present invention to provide a concept for media streaming which is more efficient in terms of, for example, transmission bandwidth consumption, latency issues and/or fair trade of bandwidth capacities among several clients.

SUMMARY

According to an embodiment, a server for streaming media content may have a reception interface configured to receive a query from a client, the query concerning the media content; a sending interface configured to push the media content to the client using a server-push technology of a network protocol at varying bitrate in units of temporal segments of the media content, wherein the sending interface is configured to push the temporal segments at varying bitrate to the client, wherein the reception interface is configured to intermittently receive reception situation updates from the client, the reception situation updates updating a description of a reception situation of the client, wherein the server has access to the media content in units of temporal segments and to each temporal segment at different bitrates belonging to different versions of the media content, wherein the server has access to a manifest describing versions at which media content is accessible for the server and a bitrate of the versions, and wherein the server is configured to derive from the manifest a bitrate adaptation to be applied by the server so as to adapt the bitrate at which the media content is to be pushed to the reception situation updates from the client.

According to another embodiment, a client for receiving a media content streamed by a server may have a sending interface configured to send a query concerning the media content to a server and to send reception situation updates to the server; a receiving interface configured to receive the media content pushed from the server using a server-push technology of a network protocol in units of temporal segments of the media content at varying bitrate.

According to another embodiment, a method for streaming media content may have a reception interface configured to receive a query from a client, the query concerning the media content; a sending interface comprised by a server configured to push the media content to the client using a server-push technology of a network protocol at varying bitrate in units of temporal segments of the media content, wherein the bitrate at which the media content is to be pushed is adapted to reception situation updates received from the client, the reception situation updates updating a description of a reception situation of the client.

According to another embodiment, a method for receiving a media content streamed by a server may have a sending interface configured to send a query concerning the media content to a server and to send reception situation updates to the server;

a receiving interface configured to receive the media content pushed from the server using a server-push technology of a network protocol in units of temporal segments of the media content at varying bitrate.

Another embodiment may have a non-transitory digital storage medium having a computer program stored thereon to perform the method for streaming media content, the method comprising a reception interface configured to receive a query from a client, the query concerning the media content; a sending interface comprised by a server configured to push the media content to the client using a server-push technology of a network protocol at varying bitrate in units of temporal segments of the media content, wherein the bitrate at which the media content is to be pushed is adapted to reception situation updates received from the client, the reception situation updates updating a description of a reception situation of the client, when said computer program is run by a computer.

Another embodiment may have a non-transitory digital storage medium having a computer program stored thereon to perform the method for receiving a media content streamed by a server, the method comprising a sending interface configured to send a query concerning the media content to a server and to send reception situation updates to the server; a receiving interface configured to receive the media content pushed from the server using a server-push technology of a network protocol in units of temporal segments of the media content at varying bitrate, when said computer program is run by a computer.

The present application describes a media streaming concept inspired by the idea that media streaming may be made more efficient in terms of, for example, transmission bitrate consumption, transmission latency and/or fair trade of transmission capacity among several clients by sending the media content to the client by pushing the media content rather than the client pulling the media content from the server. Pushing the media content to the client using a server-push technology of a network protocol at a varying bitrate enables to shift, at least partially, the control over the streaming from the client towards the sending device such as the server or proxy, namely in that, for example, the server may continue to push segments of the media content to the client even without receiving explicit queries or directives for these segments from the client thereby reducing upstream bandwidth consumption. As far as the bitrate adaption is concerned, the server may act as a slave remotely controlled by the client in that the media content is pushed at a bitrate depending on the client's most recently sent information such as reception situation information explicitly indicating the bitrate to be used. Favorably, pushing the media content may be commenced without having yet received any reception situation information from the client, namely with the server or proxy assuming that doing so preliminarily will not be harmfull, i.e. will not lead to, for example, buffer overflow at the client, and assuming that a first reception situation information will arrive from the client soon, thereby reducing the latency of the streaming. Updates concerning the reception situation information may be sent from client to server upon changing transmission bandwidth or client's buffer fullness conditions or the like only, thereby keeping bandwidth consumption low. Alternatively, bitrate adaptation control may at least partially shifted from client to server, too. For example, the bitrate adaptation control may be rendered at the server remotely influenced by the client, but this remote influence may be performed at a temporal resolution, or at occasions occurring at a mean repetition rate, which is reduced compared to a rate at which the streaming bitrate is adapted in case of a client-driven client-pull technique. Accordingly, transmission bandwidth consumption may be saved since it is possible to influence the bitrate adaptation by the client using lower bandwidth. Moreover, due to shifting the bitrate adaptation control from client towards server, the pushing of the media content may be performed at a lower latency, such as, for example, even without any output buffering. Further, shifting the bitrate adaptation control away from the client towards servers/proxies allows for a more fair distribution of available transmission bandwidth among several clients.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
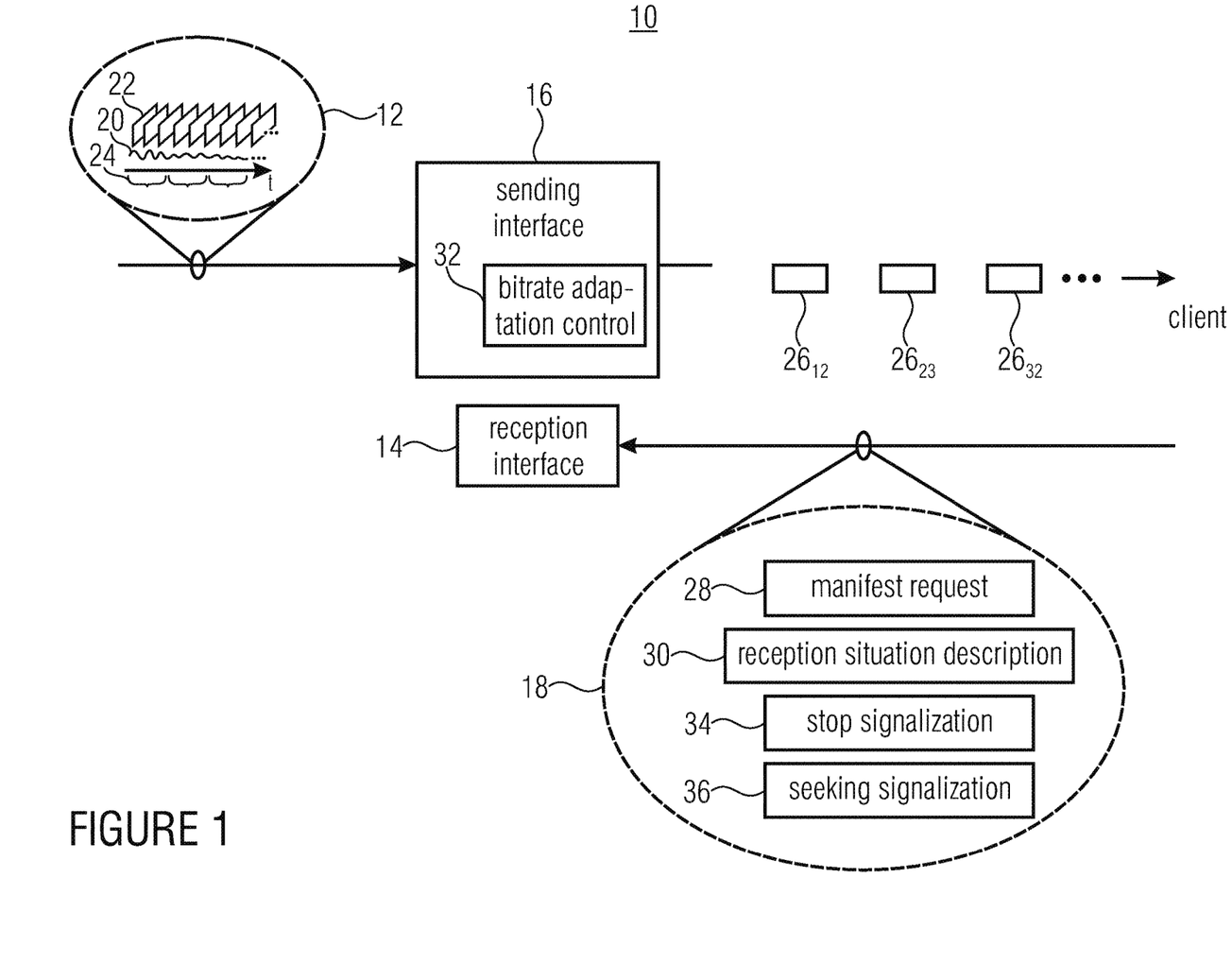
FIG. 1 shows a schematic block diagram of a device for streaming media content in accordance with embodiments.

FIG. 1 shows a device 10 for streaming a media content 12 to a client, which is not shown in FIG. 1. Device 10 comprises a reception interface 14 and a sending interface 16. The reception interface 14 is configured to receive one or more queries 18 from the client, with the same concerning the media content 12. Queries 18 of different types may exist and the meaning thereof is discussed further below.

The sending interface 16 is configured to push the media content 12 to the client using a server-push technology of a network protocol at varying bitrate. Later on, it is described that this network protocol may be HTTP/2.0, although other network protocols having a server-push capability may be used as well.

FIG. 1 illustrates that the media content 12 may, for instance, be a temporal sampling of an audio and/or video scene such as an audio signal 20 composed of a sequence of audio samples, or a video 22 composed of a sequence of images with FIG. 1 illustrating the temporal axis with "t". The media content 12 is, in particular, accessible for device 10 and sending interface 16, respectively, in units of temporal segments 24 or, alternatively speaking, sending interface 16 is able to vary the bitrate at which the media content 12 is pushed to the client in units of such temporal segments 24. This means, in turn, that the device 10 has access to the temporal segments 24 at different bitrates. For example, sending interface 16 may have the possibility to retrieve or order the temporal segments 24 at a predetermined bitrate from, for example, a media encoder not shown in FIG. 1, or sending interface 16 receives each temporal segment of the media content 12 in different versions, each being associated with a different bitrate. For example, a media encoder such as a video and/or audio encoder, provides the sending interface 16 with encoded versions of the temporal segments 24, each encoded version being associated with a different bitrate, for example.

Figure 2:
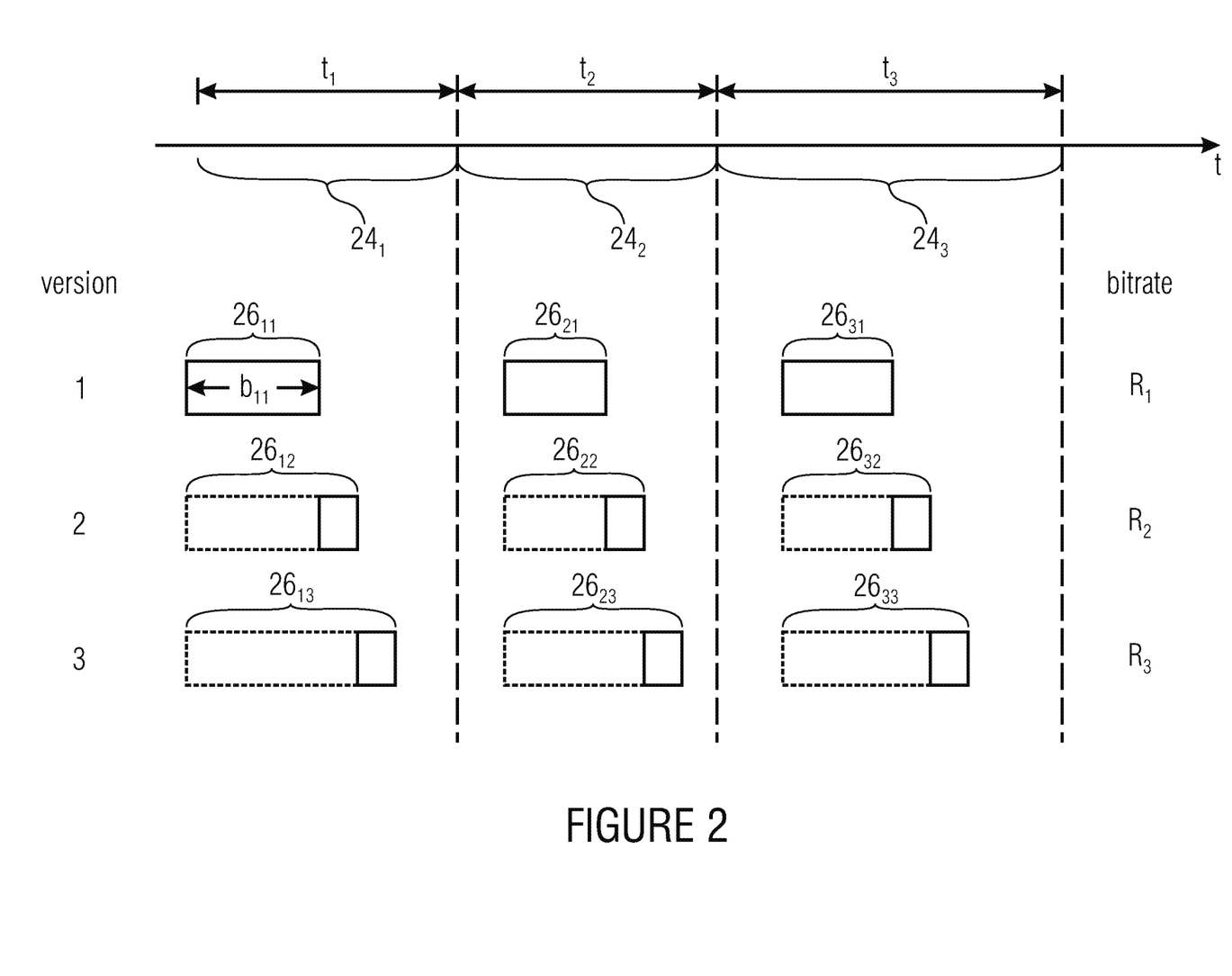
FIG. 2 shows a schematic diagram illustrating a media content and its segmentation into temporal segments which, in turn, are accessible for the device of FIG. 1 in different versions of different bitrates.

FIG. 2 illustrates the latter alternative in more detail. FIG. 2 shows the temporal sequential order of the temporal segments 24 of the media content which temporally immediately abut each other without temporal overlap. For example, the temporal length of the temporal segments 24 may be between 1 and 20 seconds, for instance. In order to distinguish between the temporal segments, an index i with in FIG. 2 exemplarily 0<i<4 is used. The index i monotonically increases, for example, with time t. Each temporal segment $24_i$ is accessible for sending interface 16 in one of different versions j with three different versions being exemplarily depicted in FIG. 2, i.e. 0<j<J+1, with here exemplarily J=3. In accordance with version j, the sequence of temporal segments $24_i$ of the media content is encoded into encoded representations $26_{ij}$ of the temporal segments $24_i$ so that version j represents the media content at a bitrate $R_j$. That is, the bit length $b_{ij}$ of the encoded representations $26_{ij}$ for the temporal segments $24_i$ divided by the temporal length $t_i$ of the respective temporal segment $24_i$ results, at least on average, for each version j into bitrate $R_j$, i.e. running-mean$_i$ $(b_{ij}/t_i)$=const.=$R_j$ or even $b_{ij}/t_i$=$R_j$ for all i. The encoded representations $26_{ij}$ of a certain version j may or may not vary around the mean bitrate $R_j$ in a running average sense for the consecutive temporal segments $24_i$. In line with the difference in bitrate of the versions, the versions j represent the respective temporal segments $24_i$, i.e. the media content, at different quality and/or information content. For example, versions of higher bitrate may represent the media content at higher quality, using a higher number of audio channels, using a higher number of views, by adding depth information, using a higher temporal resolution, using a higher spatial resolution, using a better SNR quality, using a further color component or the like. The versions j at which the media content 12 may be accessible for device 10 may be coded in a self-contained manner each, i.e. independent from any of the other versions and without exploiting any inter-version prediction so as to avoid inter-version redundancies. FIG. 2, however, illustrates using dashed lines that the encoded representations $26_{ij}$ may have alternatively been obtained using layered coding with each version, for example, corresponding to a layer of this layered coding. One of the versions, for example, such as version 1 in FIG. 2, may form a base layer of this layered coding, and other versions may represent an enhancement layer of this layered coding and may be composed of the encoded representations of the base layer and optionally any intermediate layer plus enhancement data specific for the respective enhancement layer. This is illustrated in FIG. 2 using dashed lines.

Thus, referring back to FIG. 1, the sending interface 16 is able to push the media content 12 to the client in units of the just mentioned temporal segments 24 while varying the bitrate at which the temporal segments 24 are pushed to the client. For illustration purposes, for example, FIG. 1 illustrates that the sending interface 16 pushes temporal segments $24_1$ to the client at a bitrate $R_2$ corresponding to version 2, temporal segment $24_2$ at bitrate $R_3$ corresponding to version 3 and temporal segment $24_3$ at bitrate $R_2$ corresponding to version 2. Naturally, this is merely an example and the number of versions J for the temporal segments $24_i$ could be other than 3, such as 2, 4 or any other number. Advantageously, owing to the server-push technology, sending interface 16 is able to push the media content to the client, i.e. send-out the temporal segments $24_i$ in the form of their encoded representations $26_{ij}$, on its own behalf, i.e. without being pulled to do so by way of respective requests from the client, as would be case when using network protocols not supporting server-push technology such as normal HTTP protocols.

Any query 18 from the client received at the reception interface 14 may trigger the sending interface's pushing of the media content to the client, one temporal segment after the other. After triggering the media content pushing, there is no need for any further queries or requests to be received at device 10 from the client. Rather, from that triggering event onwards, the device 10 and sending interface 16, respectively, sequentially pushes the temporal segments 24 to the client. For instance, later on embodiments will be shown according to which the sending interface 16 is configured to commence pushing the media content responsive to a manifest request 28 from the client, the manifest request 28 requesting a manifest describing versions at which the media content is accessible for device 10 and the bitrates of the versions, respectively. This manifest may, for instance, be an XML file. That is, in accordance with this alternative, device 10 commences pushing the media content responsive to the manifest request 28 inevitably without awaiting, i.e. prior to, receiving any other query 18 from the client, such as a reception situation description 30 a possible content of which is discussed hereinafter. In accordance with an alternative embodiment also described hereinafter, the pushing of the media content by the sending interface 16 is triggered as soon as the reception interface 14 has received a manifest request 28 and a reception situation description 30 from the client. An extra query especially dedicated for triggering the streaming push, could also be provided.

As described above, the sending interface 16 pushes the media content 12 to the client at varying bitrate. To this end, the sending interface 16 may comprise a bitrate adaptation control 32 configured to vary the bitrate so as to, for example, balance varying transmission bandwidth conditions and/or varying buffer fullness states at the client. The bitrate control 32 may act as a slave remotely controlled by the client via reception situation updates 30 or may evaluate the reception situation updates 30 sent from the client so as to assess an optimum bitrate for the pushing. in the latter case, bitrate adaptation control 32 evaluates, for example, a description of a reception situation of the client continuously updated, for example, by reception situation updates 30 intermittently received at the reception interface 14 from the client. The reception situation of the client described by the reception situation updates 30 describes, for example, the reception situation of the client in terms of the available downlink bandwidth available at the client, in terms of a reception delay at which downloads reach the client, in terms of network information concerning the networks via which the client is communicatively connected to outside, such as mobile 3G, mobile 4G, DSL fixed 4 Mbps, etc., in terms of a device information concerning the client or concerning the device on which the client is running, such as a mobile phone, a computer or the like, in terms of a hardware information concerning the client's hardware, such as concerning the client's CPU, memory, etc. and/or in terms of a software information concerning the client and indicating, for example, the operating system on which the client is running, such as android, windows or the like. The bitrate adaptation control 32 may take the description of the reception situation of the client into account in varying the bitrate, i.e. in selecting the bitrate at which the sequence of temporal segments of the media content are pushed to the client. That is, the bitrate adaptation control 32 varies the bitrate of the media content pushing dependent on the reception situation at the client. Additionally or alternatively, bitrate adaptation control 32 may vary the bitrate in dependence on external information. Such external information could, for instance, inform the bitrate adaptation control 32 on a strain put onto the network connecting the client with the server due to other clients and other data transfers running over this network. Such external information may or may not be related to the client. For example, the external information may be an information concerning the client's rights or priority or budget or the like. Accordingly, clients having higher priority, right or budget may be served at a higher bitrate than compared to clients having lower priority. By way of the continuous update of the reception situation at the client, however, by way of updates 30, bitrate adaptation control 32 is able to avoid, for instance, buffer overflow and/or buffer underflow situations at the client. In case of the adaptation control 32 acting as a client's slave, the updates 30 directly provide or indicate, for example, the bitrate at which the pushing of the media content's segment is to be performed till the reception of the next update 30.

Between the reception of two reception situation updates 30, the bitrate adaptation control 32 uses, as a basis for the bitrate adaptation, the reception situation as described in the earlier one of the two updates 30. That is, bitrate adaptation control 32 may use the most recently received reception situation update 30 as a description of the client reception situation and may continue, up to the reception of the next update 30, this reception situation description as a basis for selecting the bitrate at which the temporal segments are pushed to client up to the reception of the next update 30.

The bitrate adaptation control 32 may perform the bitrate adaptation according to certain rules. These rules thus define the bitrate adaptation and describe, for example, how to vary the bitrate depending on the reception situation as described and continuously updated by the reception situation updates 30 sent from the client. These rules may be defined in the aforementioned manifest file accessible for the sending interface 16 along with the media content 12. For example, manifest and media content may be stored on a storage. Alternatively, the manifest may be stored on a storage and the media content 12 or its encoded representation is output by an encoder to device 10 and sending interface 16, directly, i.e. without any buffering. Buffering of the media content 12 is not necessary due to the sending interface 16 pushing the media content to the client on its own behalf without having to await respective requests for the temporal segments from the client.

Additionally or alternatively, the aforementioned manifest may define the condition upon which the pushing of the media content is to be commenced. As denoted above, the condition may be fulfilled upon receiving a manifest request 28 only or, alternatively, upon receiving both manifest request 28 and a reception situation description 30.

Additionally or alternatively, the aforementioned manifest may define the bitrate at which the pushing is to be performed between the time instant of starting the pushing of the media conent to the client and the time instant of receiving the first reception situation description 30, if any such time discrepancy exists.

In addition to the manifest request 28 and the reception situation update 30, the queries 18 received at the reception interface 14 from the client may also comprise a stop signalization and/or a seeking signalization 34 and 36, respectively. For example, the device 10 and sending interface 16, respectively, may be responsive to a reception of the stop signalization from the client so as to stop pushing the media content to the client, and/or could be responsive to the reception of the seek signalization 36 from the client so as to resume pushing the media content 12 from a temporal position indicated within the seek signalization 36 onwards. That is, by way of seek signalization, the client would be enabled to influence the device's 10 media streaming in such a manner that, for example, the sending interface 16 pushes a temporal segment k after temporal segment j with k≠j+1. Temporal segment $24_k$ would be a temporal segment at the temporal position indicated within the seeking signalization 36 and from that temporal segment $24_k$ onwards, the media stream 12 would be pushed in units of the temporal segments, namely by resuming the media streaming with the temporal segments $24_{k+1}$, $24_{k+2}$, . . . .

Figure 3:
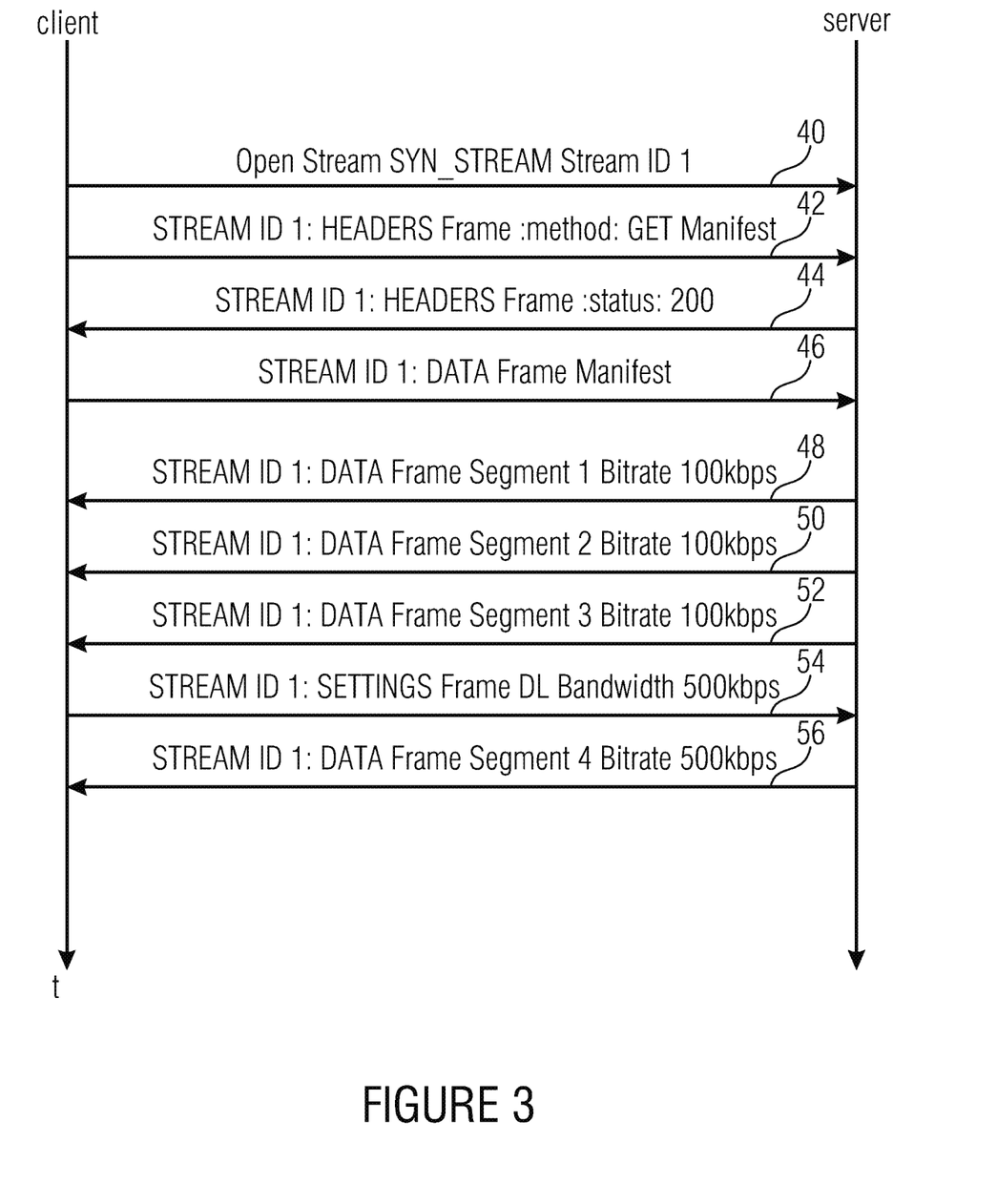
FIGS. 3 to 5 show a schematic diagram illustrating a sequence of steps performed at server and client at the beginning of a media content streaming in accordance with various specific embodiments.

FIG. 3 illustrates an exchange of data between client and server in the exemplary case of triggering the media content push by way of a reception of a manifest request only. The server is constructed as shown in FIG. 1 and a temporal axis runs in FIG. 3 from top to bottom with data leading from client to server being illustrated by an arrow running from left to right and data sent from the server to client being illustrated by arrows leading from right to left. As shown, the media download is initiated by the client by establishing a connection between client and server. In particular, the client starts with sending 40 a stream identifier to the server, the stream identifier or stream ID logically indicating the connection between clients and server and enabling discriminating between packets sent between client and server to one another on the one hand and packets sent via a network connecting client and server between other network entities on the other hand. Thereupon, using the same stream ID, the client sends 42 a manifest request to the server, which is received at the server's reception interface. Responsive thereto, the server immediately starts/commences pushing the media content to the client. In particular, in step 44, the server starts with sending a status frame to the client, using the correct stream ID, and then sends 46 the manifest to the client. The server immediately further pushes 48 the first temporal segment of the media content to the client, followed by sending 50 the second temporal segment and sending 52 the third temporal segment. FIG. 3 illustratively shows the server pushes the first three segments at a version having bitrate 100 kbps. FIG. 3 illustrates that before sending the fourth temporal segment, the server receives from the client at 54 a reception situation description 30, here illustratively indicating that the client has a reception bandwidth available of 500 kbps. Accordingly, the server may raise the bitrate at which the media stream may be pushed to the client and accordingly, pushes 56 the fourth temporal segment to the client at a higher bitrate, here exemplary exactly 500 kbps.

Thus, FIG. 3 illustrates that the server pushes temporal segments to the client according to information that the client sends to the server through reception situation updates, called "settings frames" in FIG. 3. The client can communicate its download bandwidth, roundtrip time, TCP window, etc. with the settings frames. Such settings frames may, for instance, be formed in compliance with the DASH standard, for example, but may also be formed differently or may be extended, as DASH settings frames are extendable. The client could be allowed to select specific representations/versions by way of the settings frames. In that case, the servers bitrate adaptation control 32 would act as a kind of "slave" (blindly) obeying the client's commands or bitrate wishes sent via the settings frames.

Figure 4:
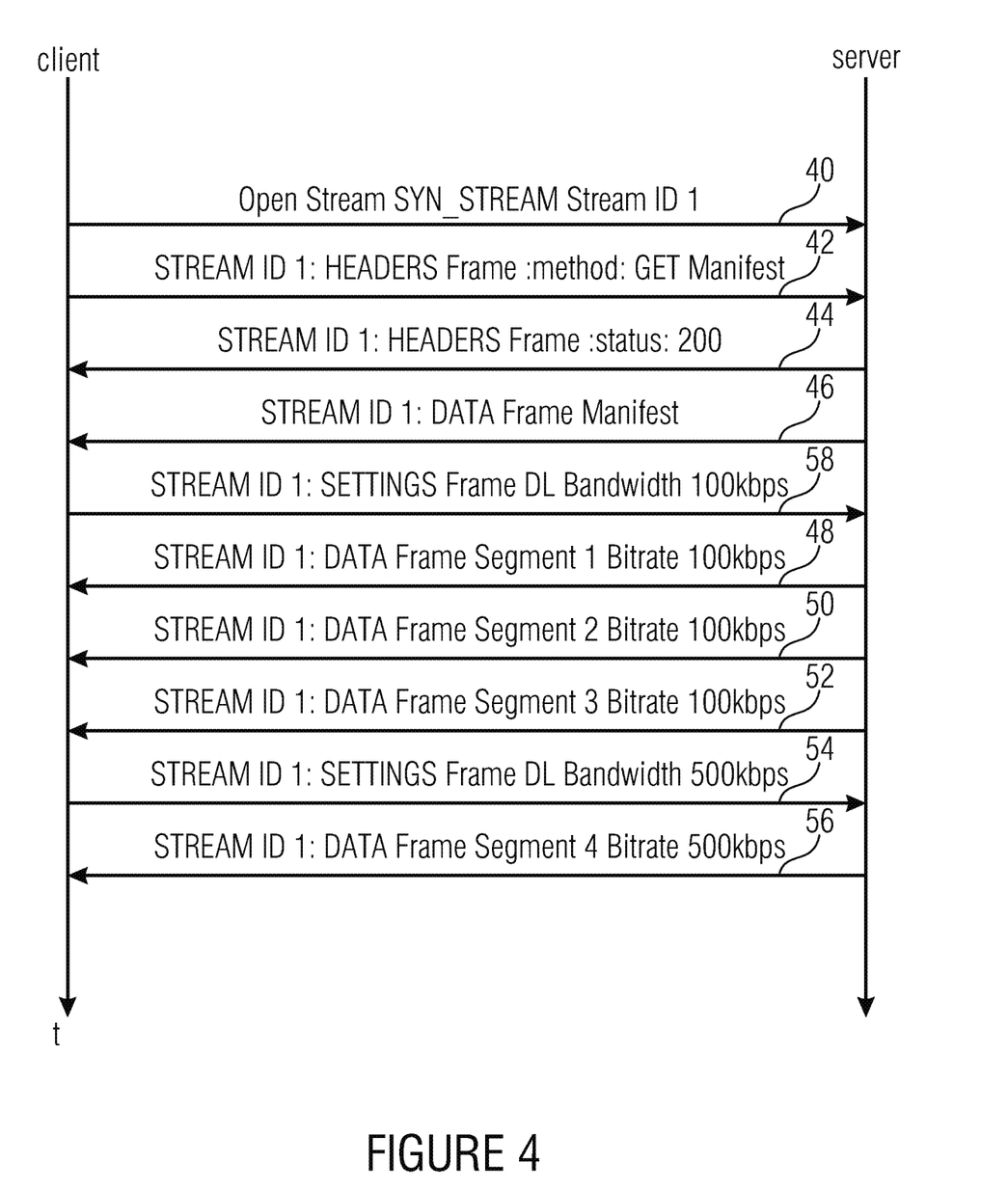

While FIG. 3 depicts that the server commences pushing temporal segments to the client without having information from the settings frames, FIG. 4 depicts a variant of FIG. 3 according to which the server defers pushing the first temporal segment in step 48 until the reception 58 of the first setting frame from the client as an answer to the manifest provided by the server to the client in step 46. That is, while the server starts pushing the media content to the client using, for example, the version of the media content associated with a minimum bitrate at which the media content is available without having any information on the reception situation of the client in the case of FIG. 3, in the case of the example of FIG. 4, the server awaits a first description on the client's reception situation first before starting pushing the media content to the client.

It should be noted that in accordance with the description brought forward above, the information for the representation selection, i.e. the reception situation update 30 (settings frames) as well as any of the other queries 18 from the client, could alternatively be signaled out of band, i.e. using another channel on another network protocol as used for the pushing of the media content from device 10 to the client, e.g. a separate HTTP connection or an alternative protocol, e.g. FTP, RTSP, etc.

Figure 5:
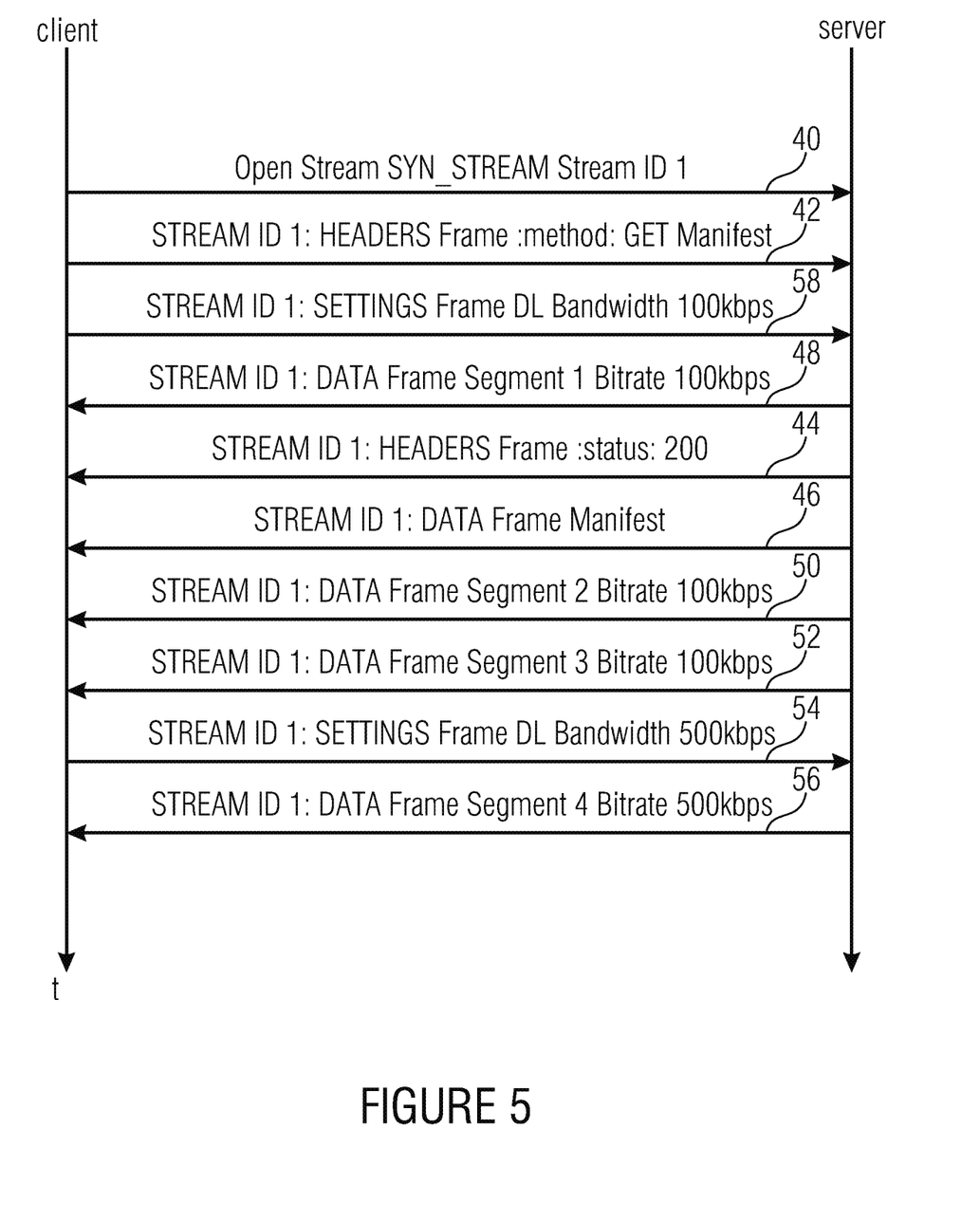

For the sake of completeness, FIG. 5 illustrates that the server may defer any data transmission towards the client until the reception 58 of the first settings frame from the client. In this regard, FIG. 5 also illustrates the possibility that, in order to compensate for the further detail, for example, this server performs the pushing 48 of the first temporal segment of the audio content prior to the sending-out 44 of the status information and the sending out of the manifest 46.

It has already been mentioned above that it would be possible that a server construed as depicted in FIG. 1 could perform a low latency dynamic adaptive live streaming or a device according to FIG. 1 could form an outbound module for a realtime communication. As mentioned above, HTTP/2.0 could be used as a basis. In particular, in that case device 10, enabled by the usage of the server push technology, would immediately push the media data to the client (or the other party in the case of the realtime communication). There would be no need to wait until a temporal segment is fully encoded. Rather, encoded frames could be pushed to the client as soon as the encoder outputs them. As the connection is persistent between client and server as established, for example, in step 40, an immediate push of a next temporal segment after a segment has been finished is possible and removes the RTT (Round Trip Time) between individual segment requests. Optionally, some frames in the encoded representations, such as I frames, could be prioritized through HTTP/2.0 stream priority. There would be no head of line blocking, e.g., a potentially blocking B frame, for example.

As far as the HTTP/2.0 server push based streaming is concerned, caching is a further aspect with respect to which the above outlined concept allows for advantages: Proxies, for example, may be used to multiplex multiple downstream HTTP/2.0 sessions to various clients in the case of live streaming, for example. These proxies could be construed as shown in FIG. 1. For m:n realtime communication, a proxy could apply multiplex downstream HTTP/2.0 sessions to various clients.

The device of FIG. 1 could also be used in the framework of a content delivery network: for example, the manifest, such as the MPD, could be deployed with additional object relation models on the server, i.e. with the aforementioned rules describing the way of performing the bitrate adaptation, for example. In other words, the object relation model could be implemented as a file which could be based on XML without being limited to that, with this file describing, for example, the push behavior. For example, if a client requests segment 1, the push strategy for this segment involves the server to send segment 2 immediately to the same client.

It has also already been mentioned above that the media streaming content described above may be used along with scalable video coding, i.e. the media content 12 pushed to the client may have been coded using scalable video coding with the various versions of different bitrate at which the media content is pushed to the client corresponding to the layers of this layered coding. Thus, scalable video coding (layered coding) can be used along with, for example, HTTP/2.0 server push strategy, and then the server could send additional enhancement layers to the client if bandwidth is available.

Figure 6:
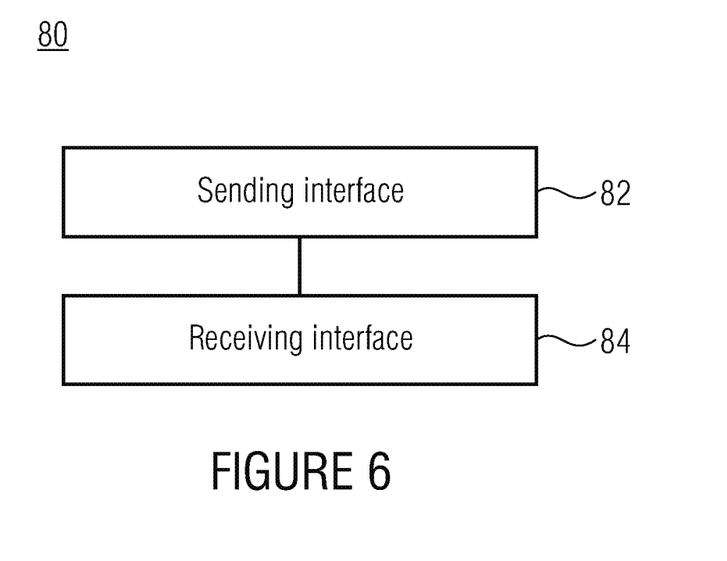
FIG. 6 shows a block diagram of a client in accordance with an embodiment of the present application.

For the sake of completeness, FIG. 6 shows a client in accordance with an embodiment of the present application. The client is generally indicated using reference sign 80 and comprises a sending interface 82 configured to send a query 18 concerning the media content streamed by a server to the server, and a receiving interface 84 configured to receive the media content pushed from the server using the server-push technology of the network protocol. That is, the sending interface 82 sends-out the aforementioned queries 18 and the receiving interface 84 receives the media content pushed from the server as described above.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive spliced or splicable audio data streams can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Christopher Mueller, Stefan Lederer, Christian Timmerer and Hermann Hellwagner, "Dynamic Adaptive Streaming over HTTP/2.0", IEEE International Conference on Multimedia and Expo (ICME), 2013.
[2] Christopher Mueller, Daniele Renzi, Stefan Lederer, Stefano Battista and Christian Timmerer, "Using Scalable Video Coding for Dynamic Adaptive Streaming over HTTP in Mobile Environments", IEEE 20th European Signal Processing Conference, 2012.
[3] IETF Working Group on HTTP/2.0, https://datatracker.ietf.org/wg/httpbis/charter/.

The invention claimed is:
1. A server for streaming media content, comprising a processor and/or electronic circuit which is programmed or configured to implement
  a reception interface configured to receive a query from a client, the query concerning the media content; and
  a sending interface configured to push the media content to the client using a server-push technology of a network protocol at varying bitrate in units of temporal segments of the media content,
  wherein the sending interface is configured to push the temporal segments at varying bitrate to the client,
  wherein the reception interface is configured to intermittently receive reception situation updates from the client, the reception situation updates updating a description of a reception situation of the client,
  wherein the processor and/or electronic circuit has access to the media content in units of temporal segments and to each temporal segment at different bitrates belonging to different versions of the media content,
  wherein the processor and/or electronic circuit has access to a manifest describing versions at which media content is accessible for the server and a bitrate of the versions, and
  wherein the processor and/or electric circuit is configured to derive from the manifest one or more predetermined rules and vary the bitrate at which temporal segments preceding a next reception situation update are pushed to the client by
    deriving a buffer fullness condition at the client from one or more previously received reception situation updates, and
    switching between the versions of the media content in a manner depending on the one or more predetermined rules and the buffer fullness condition at the client by applying the one or more predetermined rules onto the buffer fullness condition, and
  wherein the server is configured to commence the pushing the temporal segments to the client prior to a reception of the reception situation updates from the client, and using a bitrate of a predetermined version among the versions described by the manifest, by selecting the predetermined version out of the versions using the manifest.

2. The server according to claim 1, wherein the network protocol is HTTP/2.0.

3. The server according to claim 1, wherein the sending interface is configured to commence pushing the media content responsive to a manifest request from the client requesting a manifest describing versions at which the media content is accessible for the processor and/or electronic circuit, and the bitrate of the versions.

4. The server according to claim 3, wherein the versions at which the media content is accessible for the processor and/or electronic circuit are associated with different bitrates owing to different spatial resolutions, different bit depths and/or different number of audio channels and/or views.

5. The server according to claim 3, wherein the sending interface is configured to commence pushing the media content responsive to the manifest request from the client prior to receiving a reception situation description from the client describing a reception situation of the client.

6. The server according to claim 5, wherein the reception situation description describes the reception situation of the client via an available downlink bandwidth at the client, a reception delay at the client, network information concerning networks via which the client is communicatively connected to outside, a device information concerning the client, a hardware information concerning the client, and/or a software information concerning the client.

7. The server according to claim 1, wherein a rate of the reception situation updates is lower than a rate of the temporal segments.

8. The server according to claim 7, wherein the server is configured to push temporal segments of the media content between a reception of a first reception situation update and a second reception situation update at a bitrate selected among the different bitrates at which the temporal segments are accessible to the server depending on the description of the reception situation of the client as updated by the first reception situation update and external information so that the bitrates at which the temporal segments of the media content between the reception of the first and second reception situation updates varies in dependence from the external information.

9. The server according to claim 1, wherein the server is responsive to a stop signalization from the client so as to stop pushing the media content.

10. The server according to claim 1, wherein the server is responsive to a seek signalization from the client so as to resume pushing the media content from a position indicated by the seek signalization onwards.

11. The server according to claim 1, wherein the media content is encoded using layered coding and the sending interface is configured to vary the bitrate at which the media content is pushed to the client by varying a number of enhancement layers pushed to the client in addition to a base layer.

12. The server according to claim 1, wherein the server is connectable with a media encoder and is configured so that the media content is pushed to the client unbuffered.

13. The server according to claim 1, wherein the processor and/or electric circuit is configured to derive the one or more predetermined rules from the manifest in addition to versions at which the media content is accessible for the processor and/or electronic circuit, and the bitrate of the versions.

14. A method for streaming media content, comprising
receiving a query from a client, the query concerning the media content;
pushing the media content to the client using a server-push technology of a network protocol in units of temporal segments of the media content;
intermittently receiving from the client reception situation updates, the reception situation updates updating a description of a reception situation of the client, and derive from a manifest, which describes versions at which the media content is available, one or more predetermined rules;
varying a bitrate at which the media content is pushed to the client depending on the reception situation of the client, by
varying the bitrate at which temporal segments preceding a next reception situation update are pushed to the client by
deriving a buffer fullness condition at the client from one or more previously received reception situation updates, and
switching between the versions of the media content in a manner depending on the one or more predetermined rules and the buffer fullness condition at the client by applying the one or more predetermined rules onto the buffer fullness condition; and
commencing the pushing the temporal segments to the client prior to a reception of the reception situation updates from the client, and using a bitrate of a predetermined version among the versions described by the manifest, by selecting the predetermined version out of the versions using the manifest.

15. A non-transitory digital storage medium having a computer program stored thereon to perform the method for streaming media content, the method comprising
receiving a query from a client, the query concerning the media content;
pushing the media content to the client using a server-push technology of a network protocol in units of temporal segments of the media content;
intermittently receiving from the client reception situation updates, the reception situation updates updating a description of a reception situation of the client, and derive from a manifest, which describes versions at which the media content is available, one or more predetermined rules;
varying a bitrate at which the media content is pushed to the client depending on the reception situation of the client, by
varying the bitrate at which temporal segments preceding a next reception situation update are pushed to the client by
deriving a buffer fullness condition at the client from one or more previously received reception situation updates, and
switching between the versions of the media content in a manner depending on the one or more predetermined rules and the buffer fullness condition at the client by applying the one or more predetermined rules onto the buffer fullness condition; and
commencing the pushing the temporal segments to the client prior to a reception of the reception situation updates from the client, and using a bitrate of a predetermined version among the versions described by the manifest, by selecting the predetermined version out of the versions using the manifest,
when said computer program is run by a computer.

* * * * *